United States Patent [19]
Veugelers

[11] 3,961,768
[45] June 8, 1976

[54] PLUNGER VALVES

[75] Inventor: Hubertus Leonardus Martinus Veugelers, Delft, Netherlands

[73] Assignee: Conval Nederland N.V., Den Haag, Netherlands

[22] Filed: Mar. 27, 1974

[21] Appl. No.: 455,190

[30] Foreign Application Priority Data
Mar. 30, 1973   Netherlands....................... 7304432

[52] U.S. Cl................................ 251/191; 251/197; 251/324; 251/274
[51] Int. Cl.²........................................... F16K 3/28
[58] Field of Search .......... 251/191, 190, 195, 197, 251/331, 85, 324, 327, 274

[56] References Cited
UNITED STATES PATENTS

| | | | |
|---|---|---|---|
| 1,057,757 | 4/1913 | Martin ............................. | 251/274 X |
| 2,659,388 | 11/1953 | Rand............................... | 251/274 X |
| 2,840,340 | 6/1958 | Kaufmann........................ | 251/331 |
| 3,420,499 | 1/1969 | Pletcher.......................... | 251/191 X |

FOREIGN PATENTS OR APPLICATIONS

| | | | |
|---|---|---|---|
| 1,147,893 | 6/1957 | France............................ | 251/191 |
| 870,187 | 6/1961 | United Kingdom................ | 251/191 |

*Primary Examiner*—Alan Cohan
*Attorney, Agent, or Firm*—Irving M. Weiner; Pamela S. Burt

[57] ABSTRACT

A plunger valve having a straight through passage closed by a cylindrical, elastic plunger. The plunger is movable at right angles to the through passage. It is connected to a screw-threaded stem by a retaining pin which is positioned in a longitudinal open bore of the plunger. In closed position of the valve, the retaining pin contacts the opposite wall of the through passage to limit the elastic deformation of the plunger. In open position of the valve, the retaining pin is slightly retracted within its bore. The retaining pin is rigidly fixed to the stem and is rotatable in the plunger, but the plunger is held non-rotatably in the valve body by circumferential friction. The retaining pin holds the plunger by a shoulder situated in the upper part of the plunger.

3 Claims, 1 Drawing Figure

U.S. Patent June 8, 1976 3,961,768
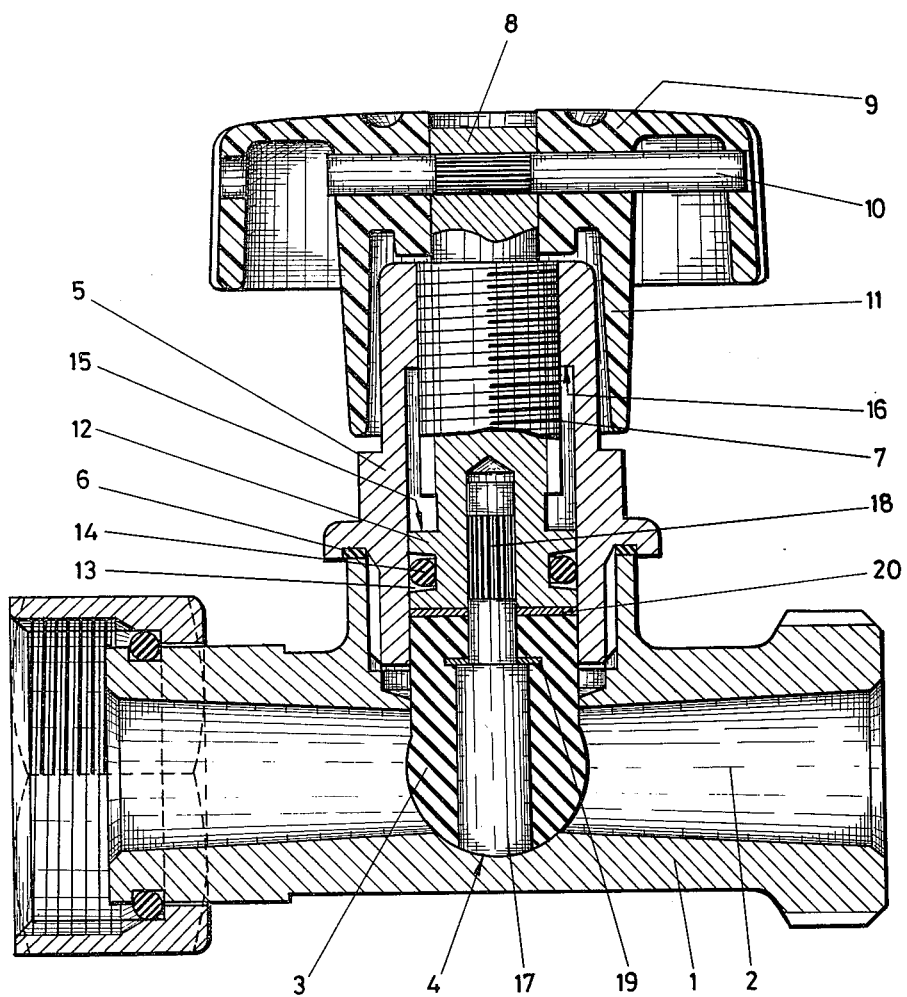

PLUNGER VALVES

This invention relates to plunger valves, comprising a body having an essentially straight through passage and a bore extending substantially normal thereto into a head piece of the body, a plunger of a rubbery or synthetic material movable in said bore with a sliding fit.

In plunger valves of this type the plunger head is pressed against an opposed wall part of the through passage when the valve is closed. Known embodiments of such plunger valves have several disadvantages. Some embodiments require straight guiding flanges on the plunger which complicates the design. In some embodiments, the pressure of the plunger against the opposed wall part of the through passage when closing the valve may rise to such high values that the plunger material is excessively deformed so that no perfect seal is obtained and the plunger is eventually damaged. In some embodiments, the opposed wall part of the through passage shows a deep recess or is of complicated shape, which is contrary to the main design idea of this valve type, namely to keep the through passage as straight and smooth as possible so as to keep the pressure drop in the valve at a minimum. In some embodiments, the plunger does not form a seal in the bore of the head piece so that additional sealing means are necessary in the head piece.

It is an object of the invention to provide a plunger valve in which the above disadvantages have been removed.

This object is attained according to the invention in providing a plunger valve comprising a body having an essentially straight through passage and a bore extending substantially normal thereto into a head piece of the body, a plunger of a rubbery or synthetic material movable in said bore with a sliding fit, said plunger being mounted with a sliding fit on a retaining pin fixed to a screw threaded stem cooperating with internal screw thread of the head piece for up and down movement of said stem with said pin and plunger, the end of said plunger facing away from said head piece being dome shaped and engeable in a shallow recess of complementary shape in the opposed wall part of said through passage, and said dome shaped end having an open bore for said retaining pin which has a retracted position within said bore when said dome shaped head is not in contact with said opposed wall part but which engages said opposed wall part when the stem is screwed down to close said passage under limited elastic deformation of said plunger.

Thus, when closing the valve, the dome shaped end of the plunger first contacts the opposed wall part of the through passage and immediately thereafter, the retaining pin engages said opposed wall part and thus limits the elastic deformation of the plunger.

Preferably, said shallow recess in the wall of the through passage and the head of said retaining pin are correspondingly dome shaped to the end of the plunger. Also, the through passage of the body may be venturi-shaped toward the plunger at both sides thereof. Thus, one obtains on the one hand a simple, efficient shape of the several parts and on the other hand a practically undisturbed passageway for the fluid flow with a minimum pressure drop. Moreover, the valve is symmetric at both sides of the plunger and thus does not require any special attention as to intended direction of fluid flow when mounting the valve in a pipe line.

Preferably, the adjacent end walls of said stem and of said plunger abut against opposite sides of e.g. bronze washer located around said retaining pin, the friction engendered between the plunger periphery and the bore in the head piece during rotation of the stem preventing rotation of the plunger. Thus, the rotation of the stem is not transferred to the plunger but is taken up by said washer and no design complications such as straight guiding flanges are necessary.

Further, the otherwise massive plunger may have a through bore of stepped down diameter in the direction of the stem, the retaining pin having a complementary shape so as to have a shoulder within said through bore, which shoulder carries a e.g. brass washer embedded in the plunger material. This feature on the one hand facilitates rotation of the retaining pin in the plunger and on the other hand it ensures an even distribution of the pulling forces of the stem on the plunger in opening the valve.

In the valve according to the invention, the plunger itself forms an almost perfect seal in the bore of the head piece of the body. However, as an additional safety measure so as to remove even the slightest possibility of leakage along the stem, the part of the stem between its screw thread and the plunger may be piston shaped and may have a peripheral groove in which an O-ring is located. Moreover, the upper end wall of said piston shaped part may form a metal-to-metal seal against the upper end wall of the bore of the head piece when the valve is in the completely open position.

In the valve according to the invention, the stem will usually protrude outside of the head piece of the body and carry a handle or wheel for its rotation. In this case, it is preferred that the handle or wheel has a downwardly directed skirt encircling the head piece of the body.

The invention will now be further elucidated with reference to the accompanying drawing which shows one embodiment of a plunger valve according to the invention in longitudinal section.

The valve body 1 has an essentially straight through passage 2 which may converge in venturi shape from both ends towards the centre of the valve, whereas in said centre, a bore extends substantially normal to said through passage into a head piece 5 of the valve body, for receiving a plunger 3. The dimensions of the cylindrical bore for the plunger 3 and the dimensions of the through passage 2 are so related to one another that in the area of the plunger 3 the passage 2 deviates as little as possible from its original shape so that in retracted position of the plunger, the fluid flow is as smooth as possible, with the least possible disturbance and a mimimum pressure drop. The wall part of the through passage 2 opposite the plunger 3 has a very shallow dome shaped depression 4. The head piece 5 is screwed into the valve body 1 concentrically with the substantially cylindrical plunger 3, a sealing ring 6 being inserted between the body and the head piece. The upper part of the head piece 5 has internal, e.g. trapezoidal screw thread which cooperates with external screw thread 7 on a stem 8 located in the head piece 5 and carrying the plunger 3.

The upper end of the stem 8 protrudes outside of the head piece 5 and carries a handle or wheel 9 of e.g. synthetic material, fixed to the stem 8 by means of e.g. a cross pin 10. The lower end of the wheel 9 carries a downwardly directed skirt or cap 11 encircling the head piece 5 in closed position of the valve and protecting the protruding part of the stem 8 in open position of the valve.

The lower end of the stem 8 is shaped as a piston 12 having a peripheral groove 13 in which an O-ring is located. The O-ring 14 seals against the inner wall of the cylindrical bore of the head piece 5, whereas the upper end wall 15 of the piston 12 may contact the upper end wall 16 of the bore of the head piece 5 in the fully opened position of the valve so as to provide a metal-to-metal seal.

The plunger 3 is made of rubbery or synthetic material and the otherwise massive plunger has a longitudinal bore with a stepped down diameter in the direction of the stem 8, a retaining pin 17 of complementary shape being located in said bore and having a lower, thicker part and an upper, thinner part 18 which is rigidly fixed into the stem 8. The retaining pin fits with a sliding fit in said bore so that it may rotate with respect to the plunger. A brass washer 19 is embedded in the material of the plunger 3 just above the shoulder between the thinner part and the thicker part of the retaining pin 17, on the one hand to facilitate rotation of the pin 17 with respect to the plunger 3 and on the other hand for evenly distributing the pulling forces of the retaining pin 17 exerted on the plunger 3 when opening the valve. Another bronze washer 20 is provided between the upper end wall of the plunger 3 and the lower end wall of the stem 8, also to facilitate rotation of the stem 8 with respect to the plunger 3 and moreover to prevent a tearing action of the stem 8 on the upper wall of the plunger 3 during such rotation.

The shape of the plunger 3 is essentially cylindrical with a dome shaped lower end, the lower end of the retaining pin 17 being correspondingly dome shaped and both being adapted to the dome shape of the shallow depression 4 in the opposed wall part of the through passage 2. When the plunger is free from said opposed wall part, the free end of the retaining pin 17 is slightly retracted within the bore open at the free end of the plunger 3, so that when the valve is closed, first the plunger 3 engages the depression 4 in the opposed wall part of the through passage and immediately thereafter, the retaining pin 17 engages said depression 4 and thus limits the elastic deformation of the plunger 3.

Since the plunger 3 fits with a sliding fit in the bore of the head piece 5 of the valve body, friction forces opposing rotation of the plunger 3 are engendered when the stem 8 is screwed down. Simultaneously, friction forces are engendered between the retaining pin 17 and the plunger 3, but the sliding fits are so chosen that the latter forces are much smaller, so that the retaining pin 17 rotates in the plunger 3 whereas rotation of the plunger 3 with respect to the valve 1 is prevented. Also, as stated above, the downward movement of the plunger 3 is limited by abutment of the retaining pin 17 against the depression 4. Because of these two factors, excessive deformation of the plunger 3 cannot occur, the plunger 3 cannot be damaged and a perfect seal of the plunger in the passageway is ensured.

In the screwed down or closed position of the valve, the plunger 3 fits snugly around the retaining pin 17 and also fits snugly into the bore of the head piece 5 and of the adjacent part of the valve body 1 and in the depression 4 of the through passage 2. Thus, even extremely high pressures at one side of the passageway 2 cannot cause a leak, on the contrary, such a pressure can only cause additional deformation of the rubbery material of the plunger toward the opposite side of the passageway 2, so that the plunger is even more firmly pressed against said side and the seal is still increased. Thus, the valve can withstand extremely high pressures.

It is an important feature that in the screwed down or closed position of the valve, the plunger 3 is located for at least about ⅓ of its length in the bore of the head piece 5 whereas the retaining pin 17 at one end firmly abuts against the depression 4 whereas the shoulder between its thicker and thinner parts is located above the through passage 2. Thus, the bending stresses caused by the unilateral load on the plunger are taken up by firm supports at both sides. Moreover, the seal of the plunger in the head piece 5 is maintained and sufficient friction is maintained in the bore of said head piece to prevent rotation of the plunger even in the initial stage of the opening movement of the valve.

Any elastomeric sealing material inert to gas and water can be used as material for the plunger 3. The metal parts of the valve may e.g. be formed by hot pressing of brass material whereas the handle may e.g. be moulded from synthetic material.

The invention provides a low cost, simple, noiseless valve having an extremely small pressure drop, being suitable for gas and water, having no preferred direction of fluid flow and having no gland while leakage along the stem is positively prevented in any position thereof. Because of the positive limitation of the plunger deformation under closing pressure, the valve is very reliable in operation even after prolonged periods of use.

For clearness' sake, the lateral deformation of the plunger has been somewhat exaggerated in the drawing. It will be appreciated that in open position, the plunger has a straight cylindrical outer periphery and the retaining pin is retracted within its bore for a few mm.

What I claim is:

1. Plunger valve comprising a body having an essentially straight through passage and a bore extending substantially normal thereto into a head piece of the body, a plunger of a rubbery or synthetic material movable in said bore with a sliding fit, said plunger being mounted with a sliding fit on a retaining fit fixed to a screw threaded stem cooperating with an internal screw thread of the head piece for up and down movement of said stem with said pin and plunger, the end of said plunger facing away from said head piece being dome-shaped and engageable in a shallow recess of a complimentary shape in the opposed wall part of said through passage, said dome-shaped end having an open bore for said retaining pin which has a retracted position within said bore when said dome-shaped head is not in contact with said opposed wall part but which engages said wall part when the stem is screwed down to close said passage under limited elastic deformation of said plunger, and in which the head of said retaining pin is correspondingly dome-shaped to said shallow recess in the wall of the through passage.

2. Plunger valve comprising a body having an essentially straight through passage and a bore extending substantially normal thereto into a head piece of the body, a plunger of a rubbery or synthetic material movable in said bore with a sliding fit, said plunger being mounted with a sliding fit on a retaining pin fixed to a screw threaded stem cooperating with an internal screw thread of the head piece for up and down movement of said stem with said pin and plunger, the end of said plunger facing away from said head piece being dome shaped and engageable in a shallow recess of complementary shape in the opposed wall part of said through passage, and said dome-shaped end having an open bore for said retaining pin which has a retracted position within said bore when said dome-shaped head is not in contact with said opposed wall part but which engages said opposed wall part when the stem is screwed down to close said passage under limited elastic deformation of said plunger; and in which the adjacent end walls of said stem and of said plunger abut against opposite sides of a bronze washer located around said retaining pin, the friction engendered between the plunger periphery and the bore in the head piece during rotation of the stem preventing rotation of the plunger; and in which the otherwise massive plunger has a through bore of stepped down diameter in the direction of the stem, the retaining pin having a complementary shape so as to have a shoulder within said through bore, which shoulder carries a brass washer embedded in the plunger material.

3. Plunger valve comprising a body having an essentially straight through passage and a bore extending substantially normal thereto into a head piece of the body, a plunger of a rubbery or synthetic material movable in said bore with a sliding fit, said plunger being mounted with a sliding fit on a retaining pin fixed to a screw threaded stem cooperating with an internal screw thread of the head piece for up and down movement of said stem with said pin and plunger, the end of said plunger facing away from said head piece being dome shaped and engageable in a shallow recess of complementary shape in the opposed wall part of said through passage, and said dome-shaped end having an open bore for said retaining pin which has a retracted position within said bore when said dome-shaped head is not in contact with said opposed wall part but which engages said opposed wall part when the stem is screwed down to close said passage under limited elastic deformation of said plunger; and in which the adjacent end walls of said stem and of said plunger abut against opposite sides of a bronze washer located around said retaining pin, the friction engendered between the plunger periphery and the bore in the head piece during rotation of the stem preventing rotation of the plunger; and in which the other wise massive plunger has a through bore of stepped down diameter in the direction of the stem, the retaining pin having a complementary shape so as to have a shoulder within said through bore, which shoulder carries a brass washer embedded in the plunger material; and in which the thicker part of the retaining pin extends from the depression in the opposed wall part of the through passage into the bore of the head piece in fully closed position of the valve.

\* \* \* \* \*